United States Patent [19]
Lee

[11] Patent Number: 5,946,434
[45] Date of Patent: Aug. 31, 1999

[54] INTEGRATED OPTIC POLARIZATION DEVICE AND METHOD

[75] Inventor: Hyung-Jae Lee, Seoul, Rep. of Korea

[73] Assignee: SamSung Electronics Co., Ltd., Kyungki-do, Rep. of Korea

[21] Appl. No.: 08/899,308

[22] Filed: Jul. 23, 1997

[30] Foreign Application Priority Data

Jul. 23, 1996 [KR] Rep. of Korea ...................... 96-29858

[51] Int. Cl.$^6$ .................................................. G02B 6/27
[52] U.S. Cl. .............................................. 385/45; 385/39
[58] Field of Search ................................ 385/45, 42, 39, 385/50, 43, 51

[56] References Cited

U.S. PATENT DOCUMENTS

| | | | |
|---|---|---|---|
| 3,909,108 | 9/1975 | Taylor | 385/40 |
| 3,967,878 | 7/1976 | Caton | 385/50 |
| 4,669,815 | 6/1987 | Thaniyavarn | 385/11 |
| 4,674,829 | 6/1987 | Bulmer et al. | 385/41 |
| 4,772,084 | 9/1988 | Bogert | 385/40 |
| 4,778,234 | 10/1988 | Papuchon et al. | 385/132 |
| 4,792,200 | 12/1988 | Amann et al. | 385/50 |
| 4,889,401 | 12/1989 | Klement et al. | 385/131 |
| 4,911,513 | 3/1990 | Valette | 385/14 |
| 4,943,131 | 7/1990 | Taki | 385/29 |
| 5,011,248 | 4/1991 | Taki | 385/14 |
| 5,111,517 | 5/1992 | Riviere | 385/11 |
| 5,125,050 | 6/1992 | Deri | 385/11 |
| 5,151,957 | 9/1992 | Riviere | 385/41 |
| 5,268,976 | 12/1993 | Lerminiaux | 385/30 |
| 5,319,494 | 6/1994 | Miyaguchi et al. | 359/487 |
| 5,436,992 | 7/1995 | Wang et al. | 385/45 |
| 5,475,771 | 12/1995 | Hosoi | 385/11 |
| 5,752,382 | 5/1998 | Shionoya et al. | 60/277 |

FOREIGN PATENT DOCUMENTS

0465425 1/1992 United Kingdom .

OTHER PUBLICATIONS

Masuda et al. "An optical TE–TM mode splitter using a LiNbO branching waveguide", American Institute of Physics, pp. 20–21, Apr. 21, 1980.

*Primary Examiner*—Rodney Bovernick
*Assistant Examiner*—Ellen E. Kang
*Attorney, Agent, or Firm*—Robert E. Bushnell, Esq.

[57] ABSTRACT

A polarization device is provided for splitting a transverse electric (TE) mode component and a transverse magnetic (TM) mode component into two output waveguides and for coupling the inputs of a TE mode component and a TM mode component to an output optical waveguide. The integrated optic polarization device includes, in an integrated optic substrate, a first waveguide capable of simultaneously allowing to pass through two mode components, whose polarizations are perpendicular to each other, and a second waveguide, in the same substrate, for allowing to pass through only one of the two polarization mode components. The device has a coupled area having a predetermined length and across which the first and second waveguides are parallel and separated by a predetermined distance. The device also has a non-coupled area in which the first and second waveguides are separated by a distance wider than the predetermined distance. The polarization device can either split or couple the polarization modes and can be made by a simple fabrication process that does not require a difficult process for setting up a precise branching angle, as is required in an existing Y-type splitter.

27 Claims, 3 Drawing Sheets

INTEGRATED OPTIC POLARIZATION DEVICE AND METHOD

CLAIM OF PRIORITY

This application makes reference to, incorporates the same herein, and claims all benefits accruing under 35 U.S.C. §119 from an application for INTEGRATED OPTIC POLARIZATION DEVICE earlier filed in the Korean Industrial Property Office on the 23$^{rd}$ day of Jul. 1996 and there duly assigned Serial No. 1996-29858, a copy of which application is annexed hereto.

BACKGROUND OF THE INVENTION

The present invention relates to an integrated optic polarization device and method, and more particularly, to a polarization splitter and method for splitting a transverse electric (TE) mode component and a transverse magnetic (TM) mode component into two output waveguides from a polarization input, and a polarization coupler and method that couples the inputs of the TE mode component and the TM mode component together into an output optical waveguide. The present invention is implemented in integrated optics based on a single mode optical waveguide.

In integrated optics, a substrate is generally selected from various materials such as glasses, ferroelectrics, semiconductors, and polymers. $LiNbO_3$, which is a ferroelectric, has been widely used in production of integrated optic devices since it has significant advantages over alternatives, such as low propagation losses and large electro-optic effects. $LiNbO_3$ is an optical crystal having high birefringence, an extraordinary refractive index of 2.202, and an ordinary refractive index of 2.286 (at a wavelength of 633 nm).

Titanium indiffusion (TI) and proton exchange (PE) are representative methods for fabricating optical waveguides on $LiNbO_3$ substrates. Titanium indiffusion refers to a method involving deposition of a thin titanium film on a portion of a surface of the $LiNbO_3$ substrate where an optical waveguide is to be formed. The complete procedure results in formation from the thin titanium film of an optical waveguide having a thickness of about several hundred Å. Thermal diffusion, performed at a high temperature of about 1,000° C. for several hours, results in diffusion of the titanium into the crystal structure of the $LiNbO_3$ substrate, which increases the refractive index of the substrate material and produces a waveguide. TI increases both the extraordinary refractive index and the ordinary refractive index, and thus a waveguide formed with TI will transmit both the TE mode component and the TM mode component of an input signal.

Proton exchange is a method for exchanging protons ($H^+$), from a proton source such as benzoic acid, for lithium ions ($Li^+$) in the $LiNbO_3$ substrate. The method is implemented by depositing a mask of metal, for example, on portions of the substrate other where the optical waveguide is to be formed. The masked substrate is then dipped in the proton source at a temperature of about 200° C., which causes proton exchange in the exposed (unmasked) portions of the substrate surface. PE increases the refractive index of the substrate material, which again creates a waveguide. In the case of PE, though, only the extraordinary refractive index is increased. The ordinary refractive index in fact decreases slightly, which results in a waveguide that will transmit either the TE mode component or the TM mode component, but not both.

Polarization splitters advantageously include, for example, an input waveguide and a first output waveguide, both fabricated by titanium diffusion, and a second output waveguide fabricated by proton exchange. The input waveguide receives a mixed (TE/TM) mode input signal, and the first and second output waveguides transmit respectively either TE and TM mode signals or TM and TE mode signals, depending on how the substrate is configured.

Existing polarization splitters often have a Y-type configuration in which the two output waveguides couple to the input waveguide at a branching angle. This configuration has the inherent disadvantage that highly efficient mode separation with it requires a sharp branching angle where the two output waveguides diverge from the input waveguide. But devices with this sharp branching angle, in turn, require precise determination of the distribution of the refractive index of the output waveguide for the TE mode.

An alternative approach for polarization devices entails directional coupling between proximal but separated waveguides in an integral substrate. In such an arrangement, the core portion of a first waveguide has an index of refraction higher for both modes than the index of refraction of the substrate, so that both modes propagate in the first waveguide. A second waveguide, disposed parallel to the first waveguide for a given length and separated therefrom by a small distance, has an index of refraction higher than that of the substrate for only one of the modes.

Through this arrangement, if the given length of the coupled area is chosen appropriately, the one polarized mode that will propagate in both of the waveguides is transferred preferentially from the first to the second waveguide, thereby realizing separation of the modes. This eliminates the need in Y-type splitters for a sharp branching angle to achieve complete separation of the modes. However, the two waveguides must be configured on the substrate to become separated physically. This is required to provide a sufficiently well-defined length of the coupled area and also to allow easier connection of fibers or other optical devices to the waveguides at the edges of the substrate.

Several U.S. patents have implemented this alternative approach in different forms, among them U.S. Pat. Nos. 4,669,815 to Thaniyavarn; 4,674,829 to Bulmer et al.; 4,772,084 to Bogert; 4,778,234 to Papuchon et al.; and 4,911,513 to Valet. The devices disclosed in these patents provide desirable results, but I have found that attention to the configuration of the waveguides can produce improved performance, and in particular results in an integrated optic device with low losses.

SUMMARY OF THE INVENTION

It is an object of the present invention to provide an integrated optic polarization device for completely splitting or coupling a TE mode component and a TM mode component without loss using birefringence and coupled optical waveguides in a substrate.

To achieve this and other objects, the present invention provides an integrated optic polarization device, comprising a first waveguide capable of propagating both of two mode components, whose polarizations are perpendicular to each other, through an integrated optic substrate; and a second waveguide for propagating one of the two polarization mode components and formed in the same integrated optic substrate. The device has a coupled area characterized by a predetermined length over which the first and second waveguides are configured to be parallel and spaced apart by a predetermined distance. It also has a non-coupled area characterized in that the first and second waveguides are separated by a wider distance than the predetermined distance in the non-coupled area.

The refractive indices of the first and second waveguides, through which both of the polarization mode components can simultaneously pass through, are identical. Moreover, the predetermined length of the coupled area is identical to or an odd multiple of the coupled length. The integrated optic substrate can be formed of any of LiNbO$_3$, an optical polymer, and a semiconductor material having birefringence. The parallel portions of the first and second waveguides define a branching axis between them. The first and second waveguides are configured in a portion of the non-coupled area adjacent an output side of the coupled area to define first and second branching angles. The first branching angle is defined between the branching axis and the first waveguide in the portion of the non-coupled area, and the second branching angle is defined between the branching axis and the second waveguide in the same portion.

BRIEF DESCRIPTION OF THE DRAWING FIGURES

A more complete appreciation of this invention, and many of the attendant advantages thereof, will be readily apparent as the same becomes better understood by reference to the following detailed description when considered in conjunction with the accompanying drawing figures, in which like reference symbols indicate the same or similar components, wherein.

DETAILED DESCRIPTION OF THE INVENTION

Figure 1:
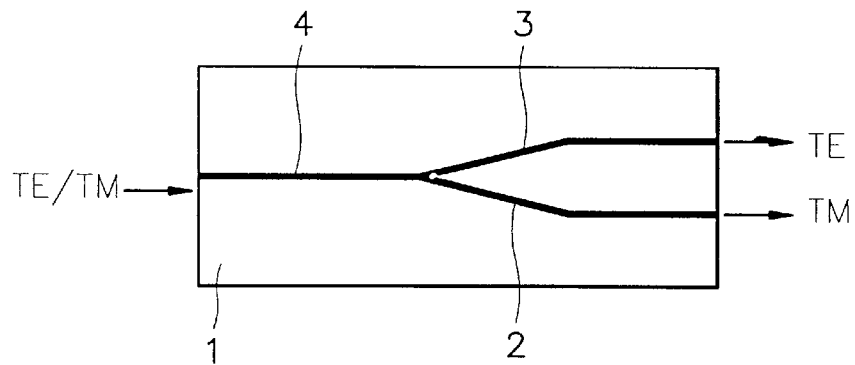
FIG. 1 illustrates an existing polarization splitter.

FIG. 1 illustrates an existing polarization splitter. Such a polarization splitter, formed by titanium indiffusion and proton exchange, may be implemented as a Y-type splitter. In particular, a TE mode output waveguide 3 is fabricated by proton exchange, and a TM mode output waveguide 2 and an input waveguide 4 are fabricated by titanium indiffusion.

Figure 2A:
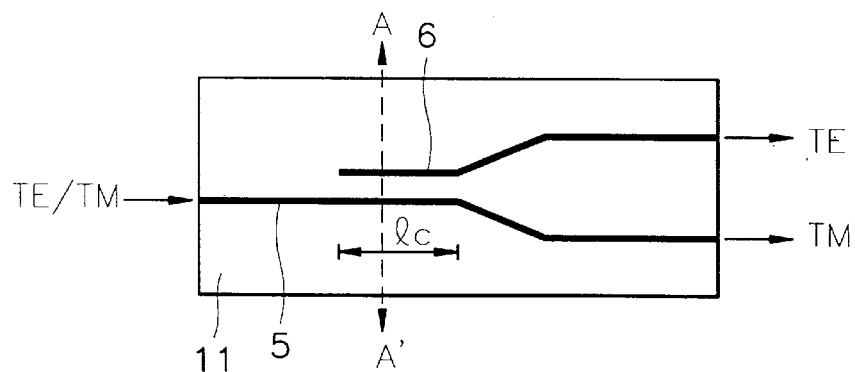
FIGS. 2A and 2B are plan views of an integrated optic polarization device, respectively, according to the present invention.
Figure 2B:
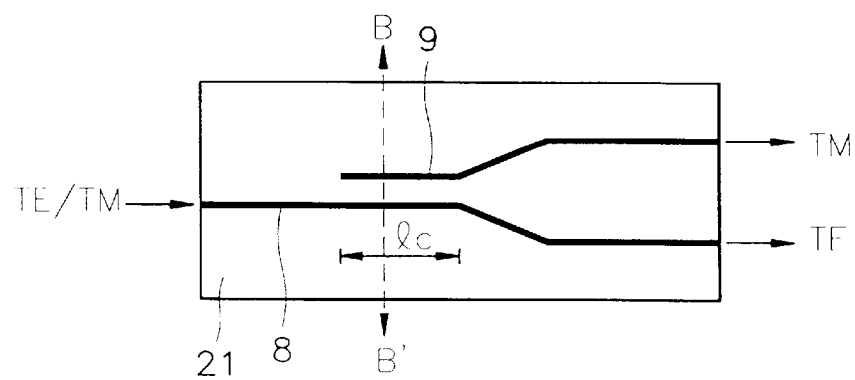

FIGS. 2A to 2B are plan views of an integrated optic polarization splitter and coupler according to the present invention. The structure of the coupled optical waveguide shown in FIGS. 2A and 2B is used in the present invention instead of the existing Y-type splitter structure.

In FIG. 2A, an optical waveguide 5 is formed on a substrate 11 by titanium indiffusion and an optical waveguide 6 is formed by proton exchange. In this case, the optical waveguide 5 is first formed by titanium indiffusion, which is a high temperature process, and then the waveguide 6 is formed by proton exchange, which is a low temperature process. When substrate 11 comprises X-cut or Y-cut LiNbO$_3$, the waveguide 6 formed by proton exchange guides only the TE mode component.

A substrate 21 comprising Z-cut LiNbO$_3$ is used in the device shown in FIG. 2B. A waveguide 9 is formed by proton exchange and guides only the TM mode component. Here, the effective refractive indices of the respective waveguide portions of the coupled waveguide are made identical to the extraordinary wave mode and the length $l_c$ of the coupled optical waveguide is formed to be identical to or an odd multiple of the coupling length. The coupling length is defined for the present invention to be the 100% transfer length of the extraordinary wave mode. 100% of the optical power is of the extraordinary wave mode is theoretically transmitted from the input optical waveguide 8 to the output optical waveguide 9 in such a coupled optical waveguide. Therefore, a 100% polarization split is performed with respect to an input polarization into the TE mode component and the TM mode component via the two output optical waveguides.

The polarization splitter can be used as a polarization coupler to couple the two polarization mode components into one waveguide when the TE mode component and the TM mode component are launched into the two optical waveguides identified as output waveguides in the structure of either FIG. 2A or FIG. 2B.

The process for forming an integrated optic polarization device according to the present invention as shown in FIG. 2A is as follows. Waveguide 5, through which two perpendicular polarization mode components can simultaneously pass, is formed in the integrated optic substrate 11. Also, waveguide 6 is formed in the integrated optic substrate 11 such that waveguide 6 parallels waveguide 5 separated therefrom at a distance δ of several μm for the coupled length $l_c$. In a preferred embodiment, δ is in the range from 0 to 10 μm. Waveguides 5 and 6 are separated by a wider distance at portions other than the coupled length $l_c$. Waveguide 6 can be formed to allow one of either of the two polarization mode components to pass through it. Here, the integrated optic substrate 11 can be formed of either LiNbO$_3$, a crystal, or a polymer having birefringence.

Figure 3A:
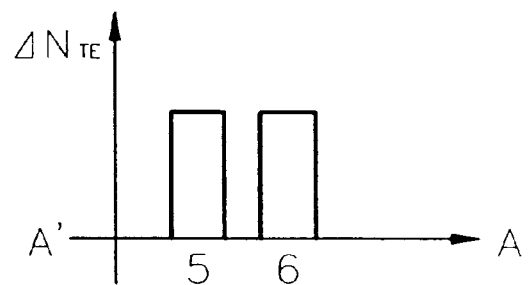
FIG. 3A is a graph showing the increase in the refractive index for a TE mode in the respective waveguides shown in FIG. 2A, as compared with the substrate.
Figure 3B:
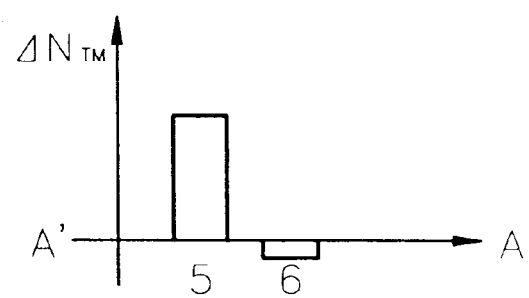
FIG. 3B is a graph showing the increase in the refractive index for a TM mode in the respective waveguides shown in FIG. 2A, as compared with the substrate.

The operation of the splitter and coupler shown in FIG. 2A can be explained by showing the increase in the effective refractive indices of the TE mode component and the TM mode component in the coupled optical waveguide regions as shown in FIGS. 3A and 3B. FIG. 3A is a graph showing the increase $\Delta N_{TE}$ in the refractive index, relative to the refractive index of substrate 11, for the TE mode in waveguides 5 and 6 shown in FIG. 2A. The refractive indices of waveguides 5 and 6 with respect to the TE mode are higher than that of the integrated optic substrate I 1 at the A–A' cross-section shown in FIG. 2A.

FIG. 3B is a graph showing the increase $\Delta N_{TM}$ in the refractive index, relative to the refractive index of substrate 11, for the TM mode in waveguides 5 and 6 of FIG. 2A. The refractive index of the waveguide 5 with respect to the TM mode is higher than that of the integrated optic substrate 11. However, the refractive index of waveguide 6 is lower than that of the integrated optic substrate 11 at the A–A' cross-section shown in FIG. 2A. Because the increase in the effective refractive index of waveguide 6 is negative for the TM mode, which makes the refractive index of waveguide 6 lower than that of substrate 11 with respect to the TM mode, the effect of waveguide 6 is negligible for the TM mode. Thus, the TM mode component proceeds in waveguide 5.

Figure 3C:
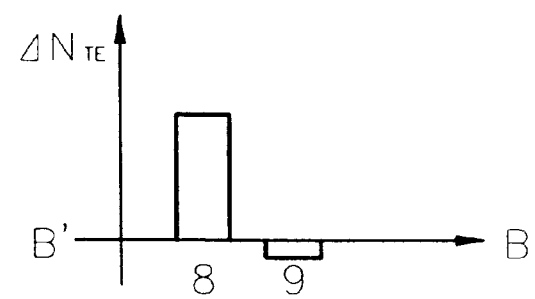
FIG. 3C is a graph showing the increase in the refractive index for a TE mode in the respective waveguides shown in FIG. 2B, as compared with the substrate.

FIG. 3C is a graph showing the increase $\Delta N_{TE}$ in the refractive index, relative to the refractive index of substrate 21, for the TE mode of waveguides 8 and 9 shown in FIG. 2B. In the B–B' cross-section shown in FIG. 2B, the refractive index of waveguide 8 for the TE mode is higher than that of the integrated optic substrate 21. However, the refractive index of waveguide 9 for the TE mode is lower than that of substrate 21.

Figure 3D:
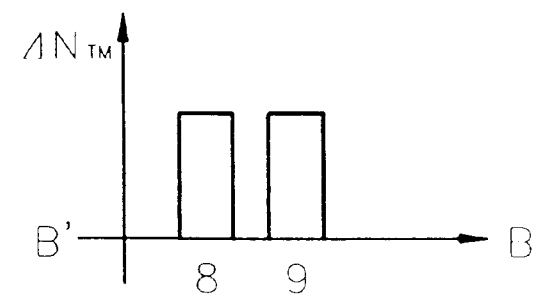
FIG. 3D is a graph showing the increase in the refractive index for a TM mode in the respective waveguides shown in FIG. 2B.

FIG. 3D is a graph showing the increase $\Delta N_{TM}$ of the refractive index in the TM mode of the respective waveguides 8 and 9 shown in FIG. 2B. The refractive indices of the respective waveguides 8 and 9 for the TM mode are higher than that of the integrated optic substrate 21 in the B–B' cross-section of FIG. 2B. The TM mode component is coupled 100% into the coupled waveguide and is output to waveguide 9, while the TE mode component continues to proceed to the optical waveguide 8. This occurs because the increase in the effective refractive index of waveguide 9 has a negative value for the TE mode, for which the refractive index of the waveguide 9 is lower than that of the substrate 21. The effect of waveguide 9 on the TE mode is therefore negligible.

In a preferred embodiment of the present invention (referring for definiteness to FIG. 2A but without limitation thereto) the first and second waveguides 5 and 6 are parallel in the coupled area and define a branching axis between and parallel to them and extending through the non-coupled area of the device. In at least a portion of the non-coupled area adjacent to one end of the coupled area, corresponding to the output side of the device of FIG. 2A, the waveguides diverge from one another.

Figure 4:
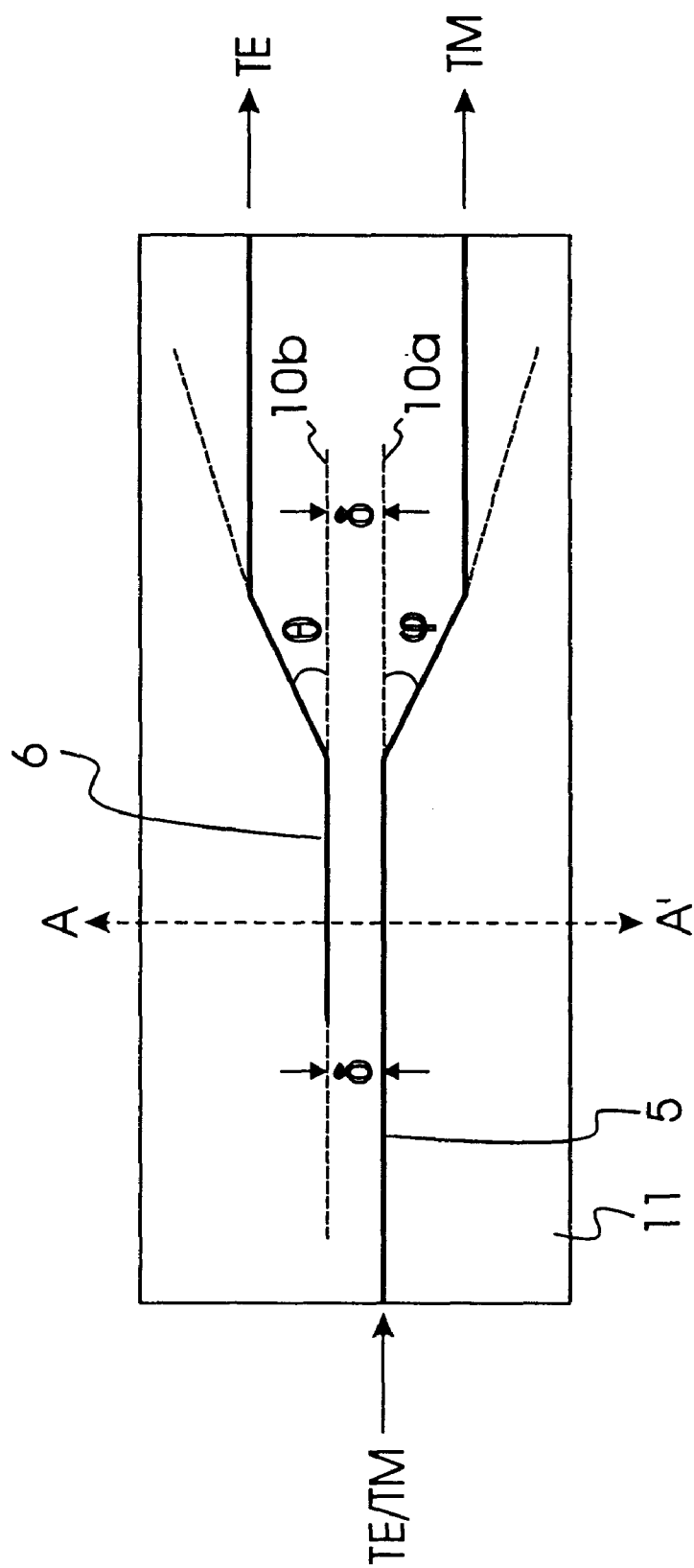
FIG. 4 is an enlarged view of the device shown in FIG. 2A that depicts the first and second branching angles.

The device of the present invention takes advantage of the fact that this divergence need not be abrupt in order to achieve complete separation of the input modes. FIG. 4 shows an enlarged view of the device of FIG. 2A, although the same features also apply to the device of FIG. 2B. The predetermined distance is represented by $\delta$. The angle $\phi$ is the first branching angle defined between waveguide 5 and a branching axis 10$a$, and the angle $\theta$ is the second branching angle defined between waveguide 6 and a branching axis 10$b$.

To minimize bending losses in the adjacent portion of the non-coupled area, the present invention includes small values of the first and second branching angles, thereby providing an integrated optic polarization splitter with low losses it is preferred that first and second waveguides diverge from the branching axis by first and second branching angles of not more than 1° each. In a preferred embodiment, the first and second branching angles are equal and their sum is less than 2°. As mentioned above, these ranges also apply to the device of FIG. 2B.

When polarized TE mode and TM mode signals are input respectively to each of the output waveguides, thereby reversing the directions of the input and output, the polarization splitter shown in FIG. 2B operates as a polarization coupler. In this mode of operation, the device of FIG. 2B couples the TE mode and TM mode into waveguide 8, which now operates as an output waveguide, without loss of optical power.

When optical communication is performed using a single mode optical fiber, polarization of the input signal is generally not maintained in the fiber. Thus, a received optical signal is often processed by dividing the same into the respective polarization modes, particularly in cases where the received signal is to be processed by an optical device that is dependent on polarization. A polarization splitter as provided by the present invention is useful split arbitrary input polarizations. It also can be used as a polarization coupler when an optical signal must be sent via a single mode optical fiber after separate signal processing for the respective polarizations.

As mentioned above, according to the present invention, a polarization device such as a polarization splitter and coupler is provided in which the polarization can be either split or coupled. The device can be made by a simple fabrication process that does not require the difficult procedure for setting up a precise branching angle as in existing Y-type splitters.

What is claimed is:

1. An integrated optic polarization device, comprising:

a substrate having, at a predetermined wavelength, a first extraordinary refractive index, and a first ordinary refractive index different from said extraordinary refractive index;

a first waveguide formed in said substrate by titanium indiffusion, said first waveguide having a second extraordinary refractive index and a second ordinary refractive index, said second extraordinary and ordinary refractive indices being greater than said first extraordinary and ordinary refractive indices of said substrate for transmitting both a transverse electric mode component and a transverse magnetic mode component of an input signal, said first waveguide having an input for receiving said input signal and an output for outputting one of said transverse electric mode and transverse magnetic mode components;

a second waveguide formed, using proton exchange, in said substrate, said second waveguide being physically separate from said first waveguide, said second waveguide having said second extraordinary refractive index and a third ordinary refractive index less than said first ordinary refractive index of said substrate, said second waveguide having an initial portion of predetermined length parallel to a first portion, having said predetermined length, of said first waveguide, said initial portion completely passing another of said transverse electric mode and transverse magnetic mode components from said first waveguide to an output of said second waveguide.

2. The integrated optic polarization device as set forth in claim 1, wherein said substrate is x-cut or y-cut lithium niobate.

3. The integrated optic polarization device as set forth in claim 2, wherein said first waveguide outputs said transverse magnetic mode component and said second waveguide outputs said transverse electric mode component.

4. The integrated optic polarization device as set forth in claim 1, wherein said substrate is z-cut lithium niobate.

5. The integrated optic polarization device as set forth in claim 4, wherein said first waveguide outputs said transverse electric mode component and said second waveguide outputs said transverse magnetic mode component.

6. The integrated optic polarization device as set forth in claim 1, wherein said initial portion of said second waveguide is separated from said parallel first portion of said first waveguide by a distance less than or equal to 10 micrometers.

7. The integrated optic polarization device as set forth in claim 1, wherein said second waveguide has a second portion which deviates from an axis of a path of said initial portion at an angle less than one degree and said first waveguide has a second portion which deviates from an axis of a path of said first portion at an angle less than one degree.

8. The integrated optic polarization device as set forth in claim 7, wherein said first waveguide has a third portion between said second portion and said output of said first waveguide, and said second waveguide has a third portion between said second portion and said output of said second waveguide, wherein said third portion of said first waveguide is parallel to said third portion of said second waveguide.

9. An integrated optic polarization device for splitting an input signal into a transverse electric mode signal and a transverse magnetic mode signal, comprising:

a substrate;

a first waveguide formed in the substrate, said first waveguide having an input port in said substrate for propagation of said input signal, said input signal comprising said transverse electric mode signal and said transverse magnetic mode signal, and an output port in said substrate for propagation of only one of said transverse electric mode signal and said transverse magnetic mode signal; and a second waveguide formed in the substrate physically separate from said first waveguide, said second waveguide having an output port for the propagation of the other one of said transverse electric mode signal and said transverse magnetic mode signal, said second waveguide having no input port;

said first and second waveguides having corresponding coupler segments that have the same length, are parallel and in close proximity to each other, the coupler segment of said first waveguide being positioned between said input and said output ports of said first waveguide, said coupler segment of said second waveguide forming an initial segment of said second waveguide for completely passing said other one of said transverse electric mode signal and transverse magnetic mode signal from said coupler segment of said first waveguide to said output port of said second waveguide.

10. The integrated optic polarization device as set forth in claim 9, wherein said substrate comprises, at a predetermined wavelength, a first extraordinary refractive index, and a first ordinary refractive index different from said extraordinary refractive index.

11. The integrated optic polarization device as set forth in claim 10, wherein said first waveguide is formed in said substrate by titanium indiffusion, said first waveguide having a second extraordinary refractive index and a second ordinary refractive index, said second extraordinary and ordinary refractive indices being greater than said first extraordinary and ordinary refractive indices of said substrate for transmitting both said transverse electric mode signal and said transverse magnetic mode signal of said input signal.

12. The integrated optic polarization device as set forth in claim 11, wherein said second waveguide is formed in said substrate by proton exchange, said second waveguide having said second extraordinary refractive index and a third ordinary refractive index less than said first ordinary refractive index of said substrate.

13. The integrated optic polarization device as set forth in claim 12, wherein said substrate is x-cut or y-cut lithium niobate.

14. The integrated optic polarization device as set forth in claim 12, wherein said substrate is z-cut lithium niobate.

15. The integrated optic polarization device as set forth in claim 14, wherein said first waveguide outputs said transverse electric mode signal and said second waveguide outputs said transverse magnetic mode signal.

16. The integrated optic polarization device as set forth in claim 12, wherein said substrate comprises an optical polymer or a semiconductor material having birefringence.

17. The integrated optic polarization device as set forth in claim 13, wherein said first waveguide outputs said transverse magnetic mode signal and said second waveguide outputs said transverse electric mode signal.

18. The integrated optic polarization device as set forth in claim 9, wherein said coupler segment of said second waveguide is separated from said parallel coupler segment of said first waveguide by a distance less than or equal to 10 micrometers.

19. The integrated optic polarization device as set forth in claim 9, wherein said second waveguide has a second segment which deviates from an axis of a path of said initial segment at an angle less than one degree and said first waveguide has a second segment which deviates from an axis of a path of said coupler segment of said first waveguide at an angle less than one degree.

20. An integrated optic polarization device for splitting an input signal into a transverse electric mode signal and a transverse magnetic mode signal, comprising:

a substrate;

a first waveguide formed in said substrate by titanium indiffusion, said first waveguide comprising:
an input port for receiving said input signal;
a first segment adjacent said input port;
a coupler segment of predetermined length adjacent said first segment;
a second segment adjacent said coupler segment;
a third segment adjacent said second segment; and
an output port for outputting one of said transverse electric mode signal and
said transverse magnetic mode signal;

a second waveguide, physically separate from said first waveguide, said second waveguide formed in said substrate by proton exchange, said second waveguide comprising:
an output port for outputting the other one of said transverse electric mode signal and a transverse magnetic mode signal;
a coupler segment having said predetermined length, parallel to and separated from said coupler segment of said first waveguide by a predetermined distance, for completely transmitting the other one of said transverse electric mode signal and said transverse magnetic mode signal to said output port of said second waveguide;
a second segment adjacent said coupler segment; and
a third segment between said second segment and said output port, said third segments of said first and second waveguides being separated from each other by a distance greater than said predetermined distance; and said first waveguide having an extraordinary refractive index equal to an extraordinary refractive index of said second waveguide in one of a transverse electric mode and a transverse magnetic mode, said extraordinary refractive index of said first and second waveguides being greater than an extraordinary refractive index of said substrate.

21. The integrated optic polarization device as set forth in claim 20, wherein said substrate is x-cut or y-cut lithium niobate.

22. The integrated optic polarization device as set forth in claim 21, wherein said first waveguide outputs said transverse magnetic mode signal and said second waveguide outputs said transverse electric mode signal.

23. The integrated optic polarization device as set forth in claim 20, wherein said substrate is z-cut lithium niobate.

24. The integrated optic polarization device as set forth in claim 23, wherein said first waveguide outputs said transverse electric mode signal and said second waveguide outputs said transverse magnetic mode signal.

25. The integrated optic polarization device as set forth in claim 20, wherein said substrate comprises an optical polymer or a semiconductor material having birefringence.

26. The integrated optic polarization device as set forth in claim 20, wherein said coupler segment of said second waveguide is separated from said parallel coupler segment of said first waveguide by a distance less than or equal to 10 micrometers.

27. The integrated optic polarization device as set forth in claim 20, wherein said second segment of said first waveguide deviates from an axis of a path of said coupler segment of said first waveguide at an angle less than one degree, and said second segment of said second waveguide deviates from an axis of a path of said coupler segment of said second waveguide at an angle less than one degree.

* * * * *